United States Patent [19]

Kawakami et al.

[11] Patent Number: 4,517,852
[45] Date of Patent: May 21, 1985

[54] CARRIAGE APPARATUS

[75] Inventors: Kouichi Kawakami, Zama; Mamoru Tanaka, Yokohama, both of Japan

[73] Assignee: Nippin Seiko Kabushiki Kaisha, Tokyo, Japan

[21] Appl. No.: 268,289

[22] Filed: May 29, 1981

[30] Foreign Application Priority Data

Jun. 4, 1980 [JP] Japan ................................ 55-74205
Jul. 2, 1980 [JP] Japan ........................... 55-92103[U]
Jul. 18, 1980 [JP] Japan ................................ 55-97572

[51] Int. Cl.³ ...................... F16H 29/20; F16C 32/06
[52] U.S. Cl. ............................ 74/89.15; 74/424.8 R; 308/5 R; 384/133
[58] Field of Search ............... 74/89.15, 424.8 R, 409, 74/441; 308/3 A, 5 R; 384/133; 277/80

[56] References Cited

U.S. PATENT DOCUMENTS

| | | | |
|---|---|---|---|
| 3,508,430 | 4/1970 | Edmonson | 308/5 R X |
| 3,855,901 | 12/1974 | Girardi | 308/5 R X |
| 4,199,996 | 4/1980 | Moriwaki et al. | 74/89.15 |
| 4,304,411 | 12/1981 | Wilcock et al. | 277/80 |

Primary Examiner—Ernest R. Purser
Attorney, Agent, or Firm—Wyatt, Gerber, Shoup, Scobey, and Badie

[57] ABSTRACT

This specification discloses a carriage apparatus including a carriage movable relative to a fixed base bed and driven by a feed screw or the like. Means for well guiding the movement of the carriage is provided between the base bed and the carriage. A ball nut threadably fitted on the feed screw for driving the carriage is coupled to the carriage through a housing, and means for absorbing displacement of the ball nut is provided between the two. Further, to prevent chiefly the rotation of the ball nut, a bellows having high rigidity for torsion and low rigidity for the other forces is provided between the ball nut and the carriage.

6 Claims, 12 Drawing Figures

CARRIAGE APPARATUS

BACKGROUND OF THE INVENTION

1. Field of the Invention

This invention relates to a carriage apparatus having a carriage guided by guide means and movable in one direction.

2. Description of the Prior Art

A carriage apparatus having a carriage driven by drive means such as a feed screw or the like, guided by guide means provided on a base bed and movable in one direction has often been used in a machine tool or a measuring instrument.

A slide guide or an antifriction guide has generally been used as the guide means of such a carriage apparatus, but in a carriage apparatus using the conventional slide guide, the accuracy and lubricating condition of the guide surface relative to the movement of the carriage are not always uniform and on the other hand, in a carriage apparatus using an antifriction guide, fluctuation often exists in the accuracy of the guide surface relative to the movement of the carriage and the dimensional accuracy of the rolling members used and, therefore, in either of these carriage apparatuses, it has been difficult to obtain an accurate operating characteristic of the carriage.

As the guide means which has particularly taken the operating characteristic of the carriage into consideration, use has also been made of static pressure guide in which fluid having a pressure is supplied between guide surfaces effecting relative movement, and the carriage is supported and guided by the static pressure of this fluid. The fluid may be liquid or gas and generally, the liquid may be oil and the gas may be air.

Such static pressure guides support the carriage by a static pressure with respect to guide surfaces having a certain area and, therefore, an average effect is obtained with regard to the accuracy of the guide surfaces. Further, the resistance to the movement of the carriage is only the frictional resistance of the fluid, and thus the sliding resistance of the carriage is small, and such static pressure guides have excellent merits for use with a carriage which requires an accurate operating characteristic. Such static pressure guides have a further merit that the support rigidity of the carriage can be controlled to a desired value by controlling the pressure or flow rate of the fluid supplied between the guide surfaces effecting relative movement.

Static pressure guides using oil as the fluid are usually adapted to receive a supply of pressurized oil from a hydraulic device provided near the carriage apparatus, but it has a disadvantage that thermal displacement arises in the carriage apparatus because the oil pressurized by the hydraulic device generally has a temperature rise which imparts a variation to the temperature of the carriage apparatus. To prevent such thermal displacement of the carriage apparatus, it is necessary to eliminate the difference between the temperature of the oil supplied and the temperature of the carriage apparatus. To make these temperatures identical, however an oil temperature adjusting apparatus having an expensive cooling device or the like is often required. Also, the hydraulic device itself for pressurizing the oil is a heat source which affects the room temperature and thus, it is difficult to make the temperature of the carriage uniform with that of the supplied oil.

On the other hand, static pressure guides using air as the fluid, unlike the static pressure guides using oil, generally adopt a concentrated supply system in which a compressed air generation source is provided at a remote location. The pressurized air can be readily obtained at normal temperatures, and, therefore, such devices hardly suffer from the problem of the carriage being thermally displaced by the temperature of the air used. Also, air is very low in viscosity as compared with oil and this leads to the advantage that the resistance to the movement of the carriage and the generation of heat resulting from viscous friction caused by the movement of the carriage are negligibly small. However, the support rigidity and load capacity of the carriage are generally small, and this leads to the disadvantage that self-excited vibration which is said to be attributable to the response delay which in turn results from the fact that air is a compressible fluid is liable to occur.

For the purpose of improving the load capacity of the static pressure guides using air for for the purpose of improving the rigidity thereof, it has been proposed to provide pockets in the guide surfaces of the guides or to use a control throttle for controlling the gas supplied, but such a static pressure gas guide bearing particularly suffers from a disadvantage that self-excited vibration is liable to occur, thus making it difficult to provide a static pressure gas bearing having a great load capacity and rigidity for practical use.

A feed screw may suitably be used as the means for moving the carriage. Such feed screws typically have an axis parallel to the direction of movement of the carriage, and are supported on the base bed for rotation about the axis but against movement in the axial direction. A nut is threadably fitted on this feed screw so that displacement of the nut in the axial direction corresponding to rotation of the feed screw is transmitted to the carriage, whereby predetermined rectilinear movement of the carriage may be obtained. As a conventional carriage apparatus, one in which the nut is directly secured to the carriage is known.

In this carriage apparatus wherein the nut is secured to the carriage, the nut moves along the guide surface of the base bed for guiding the carriage and, in order that the feed screw may maintain a proper fitting condition with respect to the nut, the axis of movement of the nut must be properly coincident with the axis of the feed screw. However, in the case of a carriage apparatus in which very high accuracy of the carriage is required, it is difficult both from the viewpoint of machining accuracy of parts and the viewpoint of assembly accuracy to make the two axes exactly coincident with each other.

That is, in the conventional carriage apparatus wherein the nut is secured to the carriage, even if the guide surface for guiding the carriage is precisely machined and a precise feed screw is employed, errors inevitably exist in the degree of straightness of the guide surface, the degree of parallelism of the guide surface to the feed screw, the eccentricity of the feed screw or the mounting of the feed screw and nut. Therefore, if a precise fit eliminating a back-lash is adopted in the guide surface portion for guiding the carriage or in the threadable fitting portion between the nut and the feed screw, defective threadable fitting results from the deviation between the axes of the nut and feed screw and rotational torque of the feed screw fluctuates and it becomes impossible to achieve highly accurate operation of the carriage.

To overcome such disadvantages of the conventional carriage apparatus, there has been proposed a carriage apparatus in which the nut is not directly secured to the carriage but supported on the carriage through a plate spring having a flat surface parallel to the direction of the axis of the feed screw. In this carriage apparatus, the threadable fitting condition between the nut and the feed screw does not become extremely deflective even if a deviation is created between the axis of the nut moved by rotation of the feed screw and the axis of the feed screw, because the nut can be minutely displaced in a direction orthogonal to the axis of the feed screw by the plate spring. However, since the nut is supported on the carriage through the plate spring (resilient member), the restitutional force of the plate spring corresponding to the displacement of the nut acts on the nut and carriage and this leads to a disadvantage that inaccurate operation such as, for example, rolling, pitching or yawing is readily imparted to the carriage. Also, where the displacement of the nut is not parallel to the axis of the feed screw but is one which involves rotation with respect to an axis other than the axis of the feed screw, torsion is created in the plate spring and in such case, the restitutional force of the plate spring acting on the nut and carriage is considerably great.

Also, in the carriage apparatus wherein the nut is secured to the carriage through a plate spring, the carriage and nut are coupled together through a plate spring of relatively small rigidity and the plate spring itself has little or no attenuation property and this has led to a disadvantage that the carriage is liable to be vibrated by extraneous force acting on the carriage or by the vibration of a motor or the like for driving the feed screw.

The static pressure guide may be provided between a block made integral with the carriage and the feed screw, and such guides may include a static pressure gas bearing in which pressurized gas is supplied between a reception surface provided on a shaft and the bearing surface of a housing to form a thin film of pressurized gas between the two, and the shaft is supported on the housing by the static pressure produced in this thin film of pressurized gas. In this bearing, the shaft is supported without contacting the housing and the resistance to the movement of the shaft is only the shearing resistance of the gas, and the resistance to the movement of the shaft is very small and, therefore, this bearing is usually used in the rotating portion or the high-speed rotating spindle of a precise measuring instrument which requires a low torque. Also, the static pressure gas bearing usually uses compressed air as the gas, and such bearing using compressed air is also suited for the purpose of cleaning the apparatus. Thus, the static pressure gas bearing has excellent merits for the purposes of low torque, high-speed rotation and cleaning, but generally it has a disadvantage that it is low in load capacity and support rigidity. Another disadvantage of the static pressure gas bearing is that self-excited vibration called air hammer is liable to occur.

For the purpose of improving the load capacity or support rigidity of the static pressure gas bearing, it has also been proposed to provide bearing pockets in the bearing surface or to control the pressure or flow rate of the supplied gas by a control throttle. With these means, however, self-excited vibration is liable to occur particularly where the supplied fluid of the static pressure bearing is gas, and it is difficult to improve the performance of such static pressure gas bearing greatly.

A static pressure gas bearing device having overcome such disadvantages is described in Japanese Pat. No. 736914 issued to the same assignee as this invention. This is a composite bearing (static pressure gas bearing device) in which the gap between a bearing surface and a surface opposed thereto communicates with a supply source of liquid having a required viscosity to form a thin film of liquid in this gap, and a gas bearing is caused to bear a load and static rigidity while, on the other hand, generation of self-excited vibration of the gas bearing is restrained by the thin film of liquid.

This composite bearing is such that liquid is supplied to the gap between a shaft and the gas bearing to thereby form a thin film of liquid between the two and self-excited vibration of the shaft is restrained by the squeeze damping effect of the thin film of liquid, but it has suffered from a disadvantage that a liquid supply device is required for supplying liquid to the gap between the shaft and the gas bearing. Also, in a static pressure gas bearing which requires precision, it has also been necessary to pay attention to the temperature of the liquid supplied.

SUMMARY OF THE INVENTION

It is an object of the present invention to provide a carriage apparatus having a carriage permitting great rigidity and load capacity to be secured by restraining the self-excited vibration of the carriage and capable of accurate operation and which is substantially free of thermal displacement which adversely affects the accuracy of positional relation.

To achieve such object of the present invention, the carriage is supported in a base bed by static pressure guide and the base bed is provided wth recesses filled with liquid having a predetermined viscosity. The carriage is also provided with protruded portions loosely fitting in recesses of the base bed, and a thin film of liquid intervenes between the carriage and the base bed. Thus, there can be provided a carriage apparatus in which the self-excited vibration of the carriage is restrained by the squeeze damping effect of the thin film of liquid and the load capacity and support rigidity are great and the operational characteristic is excellent.

It is another object of the present invention to provide a carriage apparatus having a carriage which can obtain very strict accuracy of rectilinear movement.

To achieve this object, a flange having a pair of reception surfaces perpendicular to the axis of a nut threadably fitted on a feed screw is provided to project from the outer surface of the nut. A housing having bearing surfaces opposed to the reception surfaces of the flange and loosely fitted to the nut is secured to the carriage, and bearing pockets are formed as circumferential grooves in the reception surfaces or the bearing surfaces. Pressurized fluid is supplied to the bearing pockets to support the nut with respect to the housing so that it has rigidity only in the axial direction of the feed screw, and rotation of the nut relative to the axis of the feed screw is prevented by the use of a bellows.

It is still another object of the present invention to provide a static pressure gas bearing device of simple construction which has a great load capacity and rigidity and in which no self-excited vibration is produced.

To achieve this object, pressurized gas is supplied between a reception surface provided on a shaft and the bearing surface of the housing opposed to the reception surface to support the shaft on the housing in a static pressure fashion, while a permanent magnet is secured to a vibration controlling surface provided on the shaft or the opposed vibration controlling surface of the housing opposed to the vibration controlling surface. The gas between the vibration controlling surface of the shaft and the opposed vibration controlling surface of the housing opposed to the vibration controlling surface is filled with magnetic fluid, whereby a thin film of liquid whose outflow is prevented by the permanent magnet is made to intervene between the vibration controlling surface of the shaft and the opposed vibration controlling surface of the housing.

The invention will become more fully apparent from the following detailed description thereof takne in conjunction with the accompanying drawings.

DESCRIPTION OF THE PREFERRED EMBODIMENTS

Embodiments of the present invention will hereinafter be described by reference to the accompanying drawings.

Figure 1:
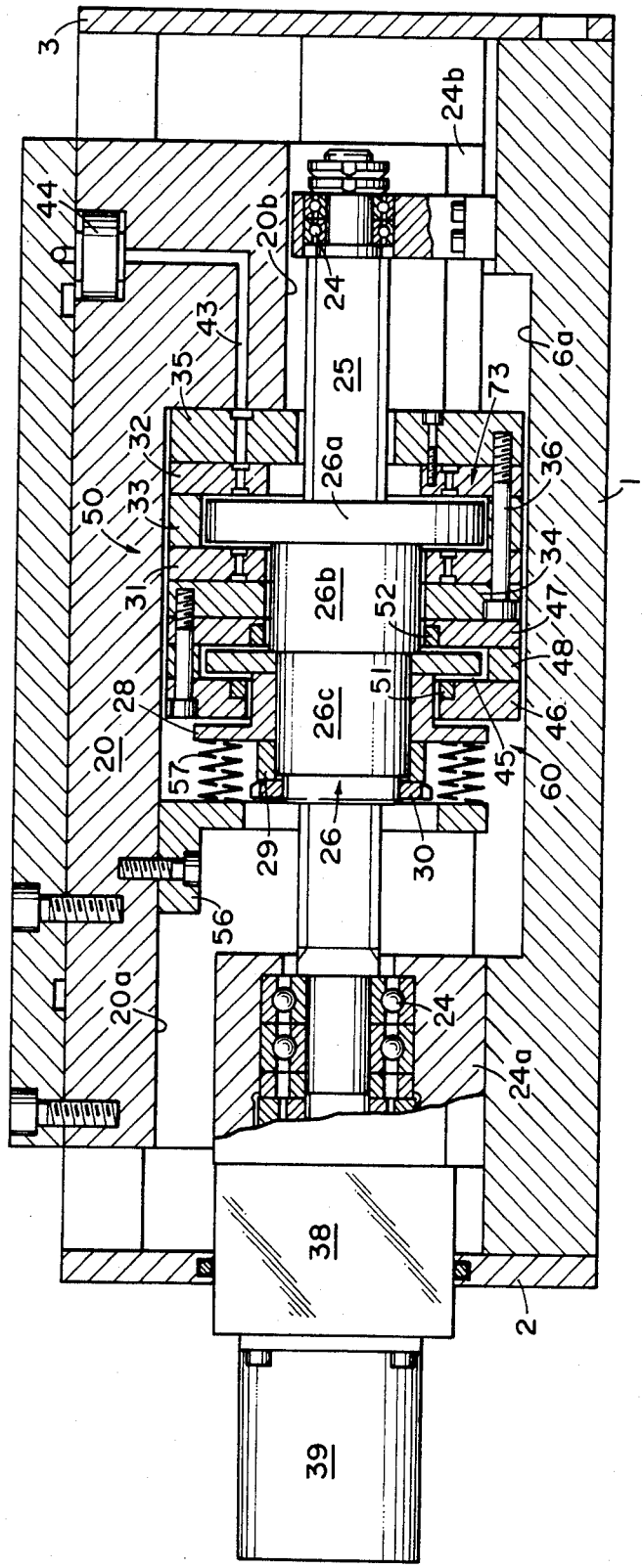
FIG. 1 is a front cross-sectional view showing an embodiment of the present invention.
Figure 2:
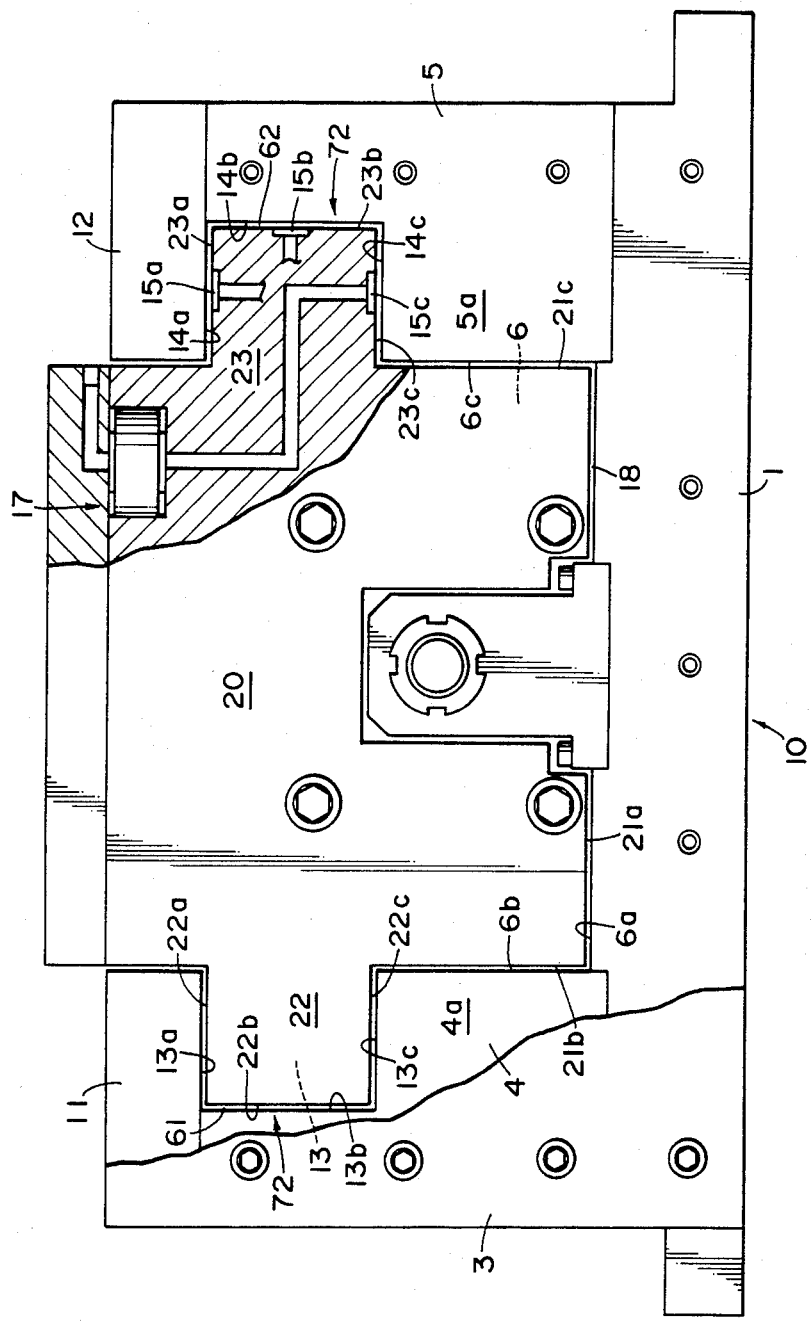
FIG. 2 is a partly broken away, right-hand side view of the embodiment.

Referring to FIGS. 1 and 2, a flat base 1 has end plates 2 and 3 fixed to the opposite ends thereof, and a pair of blocks 4 and 5 having stepped portions 4a and 5a in the intermediate parts thereof as viewed in the vertical direction are fixed in opposed relationship between the end plates. As a result, an upwardly opening recess 6 is formed in a base bed 10, and a bottom surface 6a and side surfaces 6b and 6c provide opposed surfaces of the recess 6.

Keeper plates 11 and 12 are fixed to the upper surfaces of the blocks 4 and 5, and recesses 13 and 14 are formed between the keeper plates 11, 12 and the stepped portions 4a, 5a. The side surfaces 13a, 13b and 13c of the recess 13 and the side surfaces 14a, 14b and 14c of the recess 14 provide opposed surfaces. In the respective opposed surfaces, there are formed pockets 15a, 15b and 15c (only the pockets on one side are shown) which communicate with a control throttle 17 by way of suitable passage 16. This control throttle 17 is provided with two pressure reducing chambers (not shown), and the pockets 15a and 15c communicate with one of the pressure reducing chambers and the pocket 15b and an unshown pocket on the side of the protruded portion 22 communicate with the other pressure reducing chamber.

In the recess 6 of the base bed 10, a carriage 20 is fitted for lengthwise movement. As can be seen in FIG. 2, the carriage 20 generally takes a substantially rectangular shape, but has a pair of protruded portions, 22 and 23 on the sides thereof and a protruded portion 21 in the lower part. The respective protruded portions have opposed reception surfaces 21a, 21b, 21c, reception surfaces 22a, 22b, 22c and reception surfaces 23a, 23b, 23c. Gaps 61 and 62 are formed between the base bed 10 and the carriage 20. The carriage 20 has large open portion 20a and a smaller open portion 20b in the underside thereof, and a ball screw 60 is incorporated in these open portions. Liquid is stored in the recess 6, and this liquid fills the gap 18 between the opposed surfaces 6a, 6b, 6c and the opposed surfaces 21a, 21b, 21c.

Brackets 24a and 24b located in the open portions 20a or 20b are fixed to the base 1, and a screw shaft 25 is journalled by bearings 24 in the respective brackets. A ball nut 26 having a flanged portion 26a at one end and comprising a large-diametered portion 26b and a small-diametered portion 26c is screwed onto the screw shaft 25. A vibration controlling disc 27 is fitted on the small-diametered portion 26c of the ball nut 26 and is positioned by utilization of the stepped portion and is tightly fixed by a nut 30 through a washer 28 of L-shaped cross-section and a spacer 29. The screw shaft 25 is operatively connected to a motor 39 through a reduction gear 38.

Figure 3:
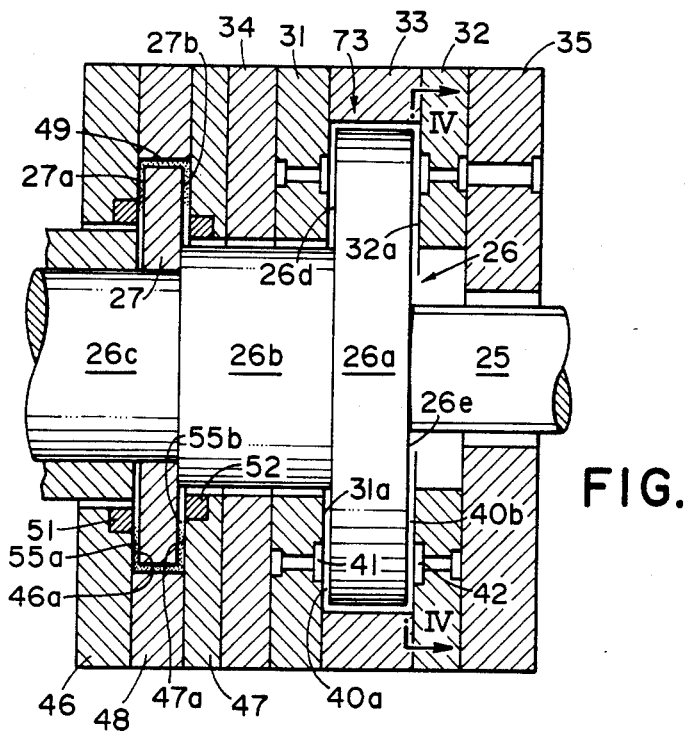
FIG. 3 is an enlarged view of essential portions of FIG. 1.
Figure 4:
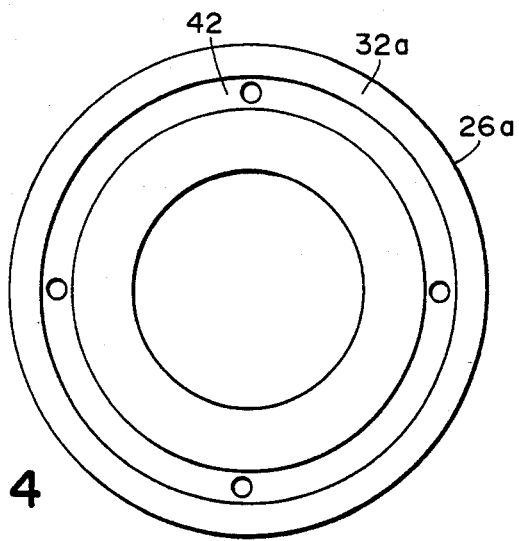
FIG. 4 is a cross-sectional view taken along line IV—IV in FIG. 3.

As shown in FIGS. 1 and 3, a pair of side plates 31 and 32 are located on the opposite sides of the flanged portion 26a, and a spacer 33 is located outside of the periphery of the flanged portion 26a, and they are fixed to the carriage 20 by bolts 36 with side plates 34 and 35 located on the sides of the side plates 31 and 32. The side surfaces 31a and 32a of the side plates 31 and 32 provide reception surfaces while the side surfaces 26d and 26e of the flanged portion 26a provide opposed surfaces, and gaps 40a and 40b are formed between the two surfaces. Annular groove-like pockets 41 and 42 as shown in FIG. 4 are formed in the reception surfaces 31a and 32a and are respectively connected to the pressure reducing chambers of the control throttle 44 by a passage 43 and another passage, not shown.

A pair of side plates 46 and 47 are located on the opposite sides of the vibration controlling disc 27 and a spacer 48 is located outside of the periphery of the vibration controlling disc 27, and these are fixed to the side plate 34 by bolts to form a block 50. Predetermined gaps 55a and 55b are formed between the vibration controlling surfaces 27a, 27b of the vibration controlling disc 27 and the reception surfaces 46a, 47a of the side plates 46, 47, and a magnetic fluid is poured into these gaps. Leakage of the magnetic fluid is prevented by annular permanent magnets 51 and 52 mounted to the side plates 46 and 47. A bellows 57 comprising a thin metal tube shaped into the form of bellows is disposed between the washer 28 and a bracket 56 secured to the carriage 20.

In operation, the screw shaft 25 is rotated by the motor 39 through the reduction gear 38 and, also, compressed air is supplied to static pressure gas bearings 71, 72 and 73 from passages 16, 43, etc. When the screw shaft 25 is rotated, the ball nut 26 threadably fitted thereto is moved back and forth and the carriage 20 is smoothly and accurately moved without vibration through the static pressure gas bearings 71, 72, 73 and the liquid in the gap 18 and the magnetic fluid in the gaps 55a, 55b.

That is, liquid fills the gap 18 between the recess 6 of the base bed 10 and the protruded portion 21 of the carriage 20, and compressed air is supplied to the gaps 61, 62 between the recesses 13, 14 and the protruded portions 22, 23. Also, compressed gas is suppled from the pockets 41, 42 to the gaps 40a, 40b between the flanged portion 26a and the block 50, and magnetic fluid is contained in the gaps 55a, 55b between the vibration controlling disc 27 and the block 50.

Accordingly, between the base 1 and the blocks 4, 5 and the carriage 20, where the carriage 20 is displaced by an extraneous force exerted thereon, even if the bearing gap of the static pressure gas bearings 71, 72 is varied in accordance with the displacement of the carriage and a pressure difference is produced between the bearings 71 and 72 on the basis of said variation, such pressure difference is eliminated by the action of the throttle 17 and thus, the carriage 20 is supported by the blocks 4 and 5 with high support rigidity.

On the other hand, liquid fills the gap 6 to form a thin film of liquid and therefore, due to the squeeze damping effect thereof, a checking force proportional to the movement velocity of the carriage 20 is obtained for the self-excited vibration of the carriage 20.

Also, between the ball nut 50 and the carriage 20, even if the flanged portion 26a, namely, the ball nut 26, is displaced, that displacement is absorbed by the static pressure gas bearing 73 in the same manner as the bearings 71, 72 due to the action of the compressed gas supplied to the pockets 41 and 42, and the ball nut 26 is supported by the housing 50 with high support rigidity. On the other hand, due to the action of a thin film formed by magnetic fluid filling the gaps 55a, 55b, the vibration controlling disc 27 is prevented from vibrating relative to the housing 50. In this manner, the ball nut 26 is highly accurately connected to the housing 50 in a double sense and precise and smooth transmission free of vibration is effected between the two.

In addition, the bellows 57 disposed between the washer 28, i.e., the ball nut 26, and the bracket 56 has great rigidity for torsion but small rigidity in the other directions (the axial direction and the direction perpendicular to the axis) and therefore, the attendant rotation of the ball nut 26 is well prevented without the movement thereof being hampered. The bellows 57 also well absorbs any error in the degree of parallelism between the movement direction of the carriage 20 and the feed screw 25 and the eccentricity of the feed screw 25.

Figure 5:
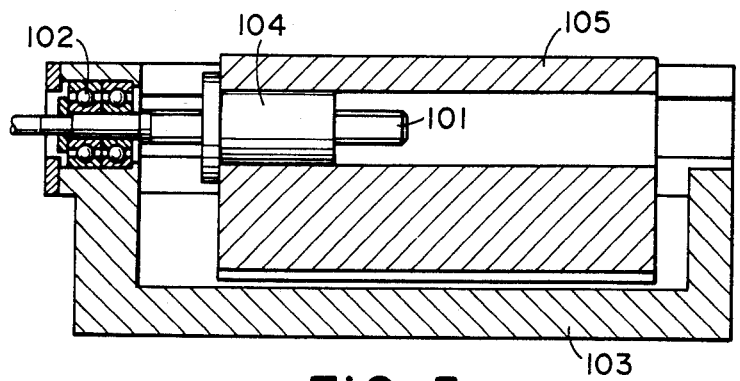
FIGS. 5 and 6 are a front cross-sectional view and a right-hand side view, respectively, showing another embodiment of the present invention.
Figure 6:
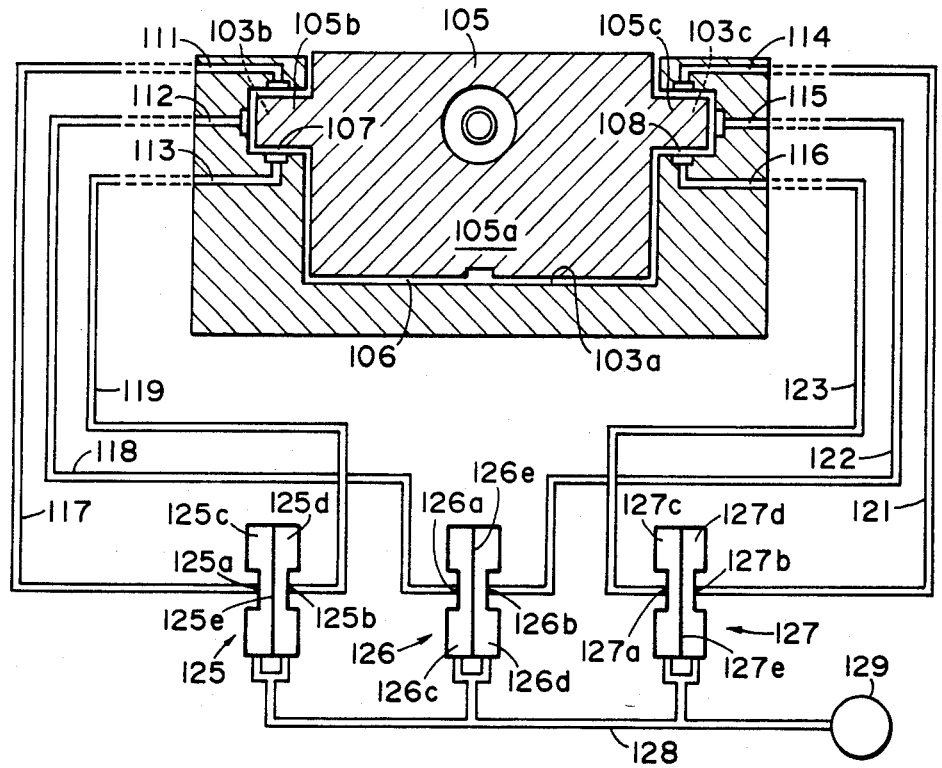

Another embodiment of the present invention will hereinafter be described. FIGS. 5 and 6 show a modification of the movement guide means between the carriage and the base bed.

For simplicity of description, portions of the present embodiment which differ from those of the above-described embodiment will be described chiefly. A feed screw 101 is supported on a base bed 103 by a ball bearing 102 in a cantilevered fashion, and a ball nut 104 threadably fitted on the feed screw is made integral with a carriage 105.

The base bed 103 is provided with three recesses 103a, 103b and 103c while the carriage 105 is provided with three protruded portions 105a, 105b and 105c corresponding thereto, and a gap 106 is filled with liquid and compressed air is supplied to gaps 107 and 108. Pockets are formed in the guide surfaces of the recesses 103b and 103c and connected to the discharge ports 125a, 126a, 127a and the discharge ports 125b, 126b, 127b of control throttles 125, 126 and 127 by gas passages 111, 112, 113, gas passages 114, 115, 116, conduits 117, 118, 119 and conduits 121, 122, 123.

The respective throttles 125, 126 and 127 are provided with two pressure reducing chambers 125c, 125d; 126c, 126d and 127c, 127d and are partitioned by groove films 125e, 126e and 127e. Each pressure reducing chamber is connected to an air source 129 by a conduit 128.

Figure 7:
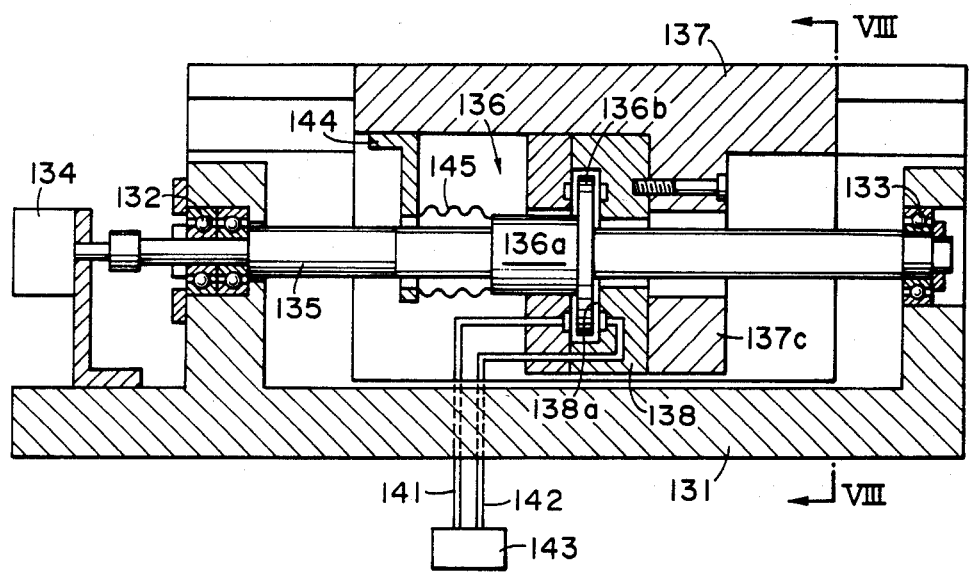
FIG. 7 is a front cross-sectional view showing still another embodiment of the present invention.
Figure 8:
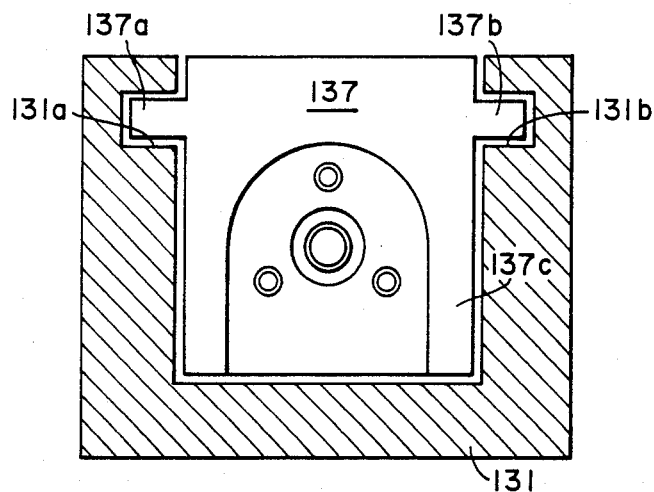
FIG. 8 is a cross-sectional view taken along line VIII—VIII in FIG. 7.

In the modification shown in FIGS. 7 and 8, a ball nut 136 comprising a cylindrical portion 136a and a flanged portion 136b is threadably fitted on a feed screw 135 having its opposite ends supported relative to a base bed 131 by ball bearings 132 and 133 and rotated by a motor 134. A carriage 137 is movable lengthwise thereof with the protrusions 137a and 137b on the opposite sides thereof fitted in and guided by the recesses 131a and 131b of the base bed 131.

The carriage 137 is provided with a depending portion 137c in the intermediate portion thereof and a block-like housing 138 is fixed thereto. The housing is provided with a recess 138a corresponding to the flanged portion 136b, and pockets are formed in the opposed surfaces opposed to the side surfaces of the flanged portion. Each pocket is connected to an air source 143 by a gas passage and conduits 141, 142. Liquid may be employed instead of gas. A bellows 145 is disposed between the cylindrical portion 136a of the ball nut 136 and a bracket 144 fixed to the carriage 137.

FIGS. 9 to 12 show modifications of the static pressure gas bearing device.

Figure 9:
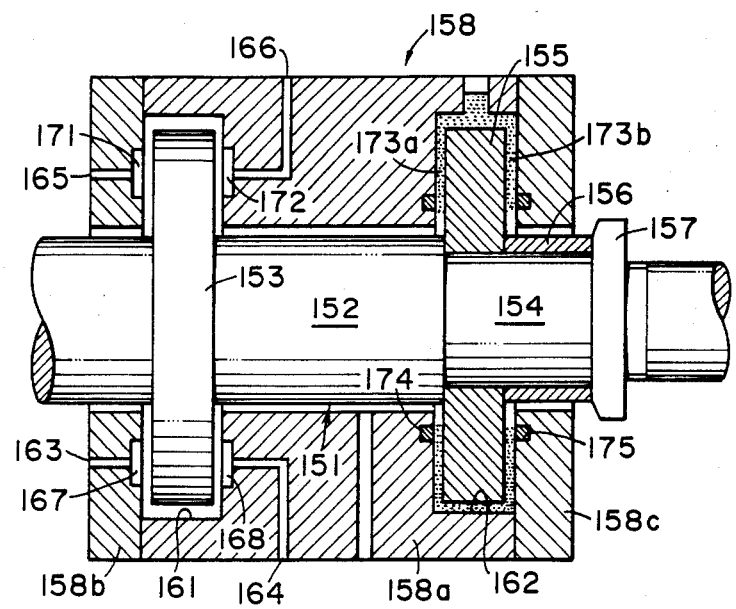
FIGS. 9 to 12 are cross-sectional views showing essential portions of modifications of the static pressure gas bearing.

In FIG. 9, a shaft 151 is provided with a flanged portion 153 in the large-diametered portion 152 thereof, and a vibration controlling disc 155 is fitted and positioned on the small-diametered portion 154 of the shaft 151 by utilization of the step difference between the large-diametered portion 152 and the small-diametered portion 154 and is tightly fixed by a collar 156 and a nut 157. A housing 158 comprises a central body 158a and lid members 158b, 158c on the opposite sides of the central body, and these define recesses 161 and 162 corresponding to the flanged portion 153 and the vibration controlling disc 155. Compressed gas is supplied from gas passages 163, 164, 165 and 166 to pockets 167, 168, 171 and 172, and magnetic fluid is enclosed in the gaps 173a, 173b between the vibration controlling disc 155 and the recess 162 and leakage of the magnetic fluid is prevented by permanent magnets 174 and 175.

Figure 10:
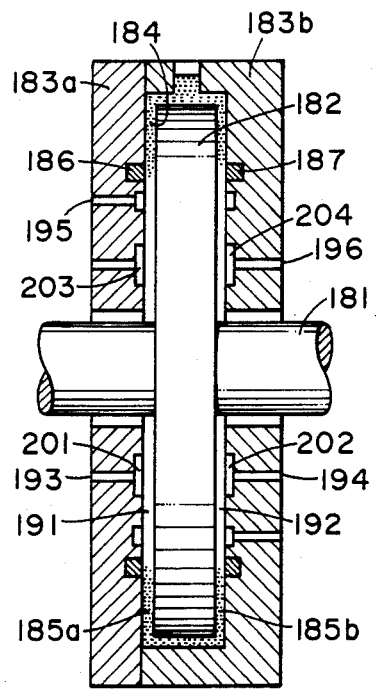

In FIG. 10, a shaft 181 is formed with a large-diametered flanged portion 182, and a recess 184 corresponding thereto is formed in housings 183a, 183b. Magnetic fluid is enclosed in gaps 185a and 185b between the outward part of the flanged portion 182 and a recess opposed thereto, and leakage of the magnetic fluid is prevented by permanent magnets 186 and 187. Compressed air is supplied through gas passages 193, 194; 195, 196 to pockets 201, 202; 203, 204 opposed to the inward part of the flanged portion 182.

Figure 11:
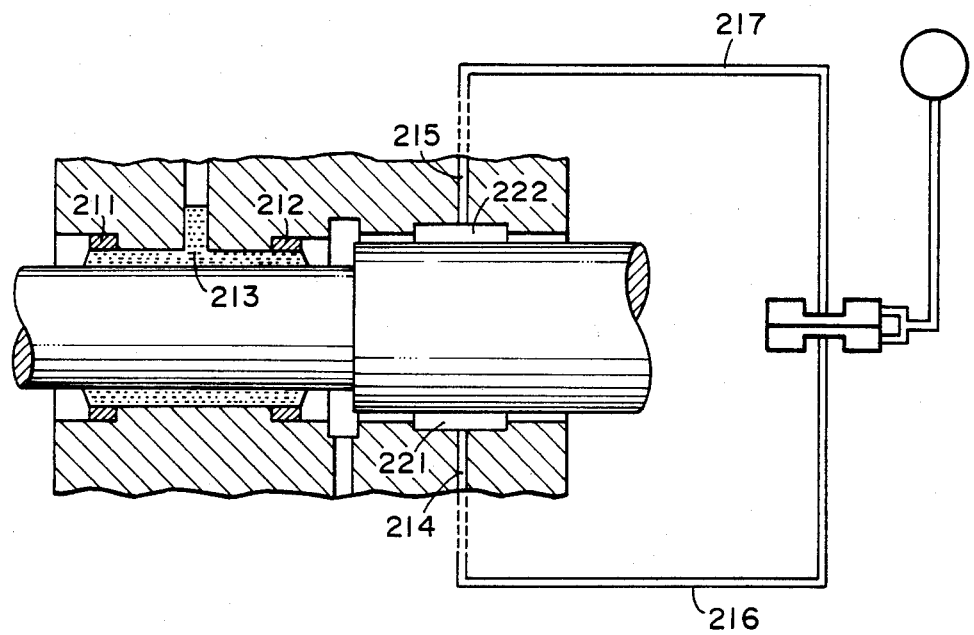
Figure 12:
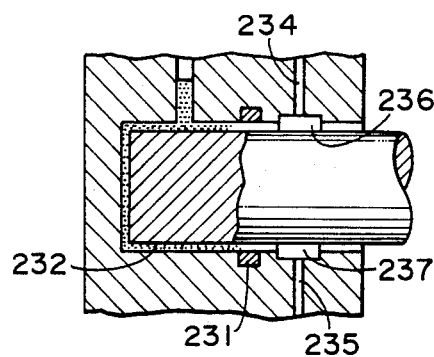

In FIGS. 11 and 12, the shaft is formed with no flanged portion, and one of gaps between the outer peripheral surface (vibration controlling surface) of the shaft and the surface (reception surface) of the housing which is opposed thereto is supplied or filled with compressed air and the other of the gaps is supplied or filled with magnetic fluid.

That is, in FIG. 11, compressed gas is supplied to the right gaps (pockets) 221, 222 from gas passages 216, 217 and magnetic fluid is charged into the left gap 213, and leakage of the magnetic fluid is prevented by permanent magnets 211 and 212.

In FIG. 12, compressed air is supplied to the right pockets 236, 237 from gas passages 234, 235 and leakage of magnetic fluid charged into the left gap 232 is prevented by a permanent magnet 231.

Generally describing the features of the present invention, between the carriage and the base bed, the carriage is supported on the base bed by static pressure gas guide means and therefore, an average effect is obtained in the guide accuracy of the carriage, thus enabling precise guide. Also, the fact that the carriage is supported on the base bed with gas interposed therebetween leads to a very small sliding resistance of the carriage, and fluctuation of the sliding resistance and generation of heat resulting from movement of the carriage become negligible. Gas at normal temperature can be easily obtained as the gas supplied to the static pressure gas guide and this leads to the possibility of achieving a carriage apparatus which is almost free of thermal displacement.

Also, the recess of the base bed having a surface parallel to the direction of movement of the carriage is filled with a predetermined amount of liquid, whereby a thin film of liquid is formed between the surface of the recess parallel to the direction of movement of the carriage and the surface of the carriage opposed to said surface and vibration of the carriage is restrained by the squeeze damping effect of this thin film. This leads to an effect that there is obtained a precise carriage apparatus which is capable of accurate operation and which is free of any variation in relative position which would otherwise result from thermal displacement.

Also, self-excited vibration of the carriage is effectively restrained by the formation of the thin film. Heretofore, generation of self-excited vibration has precluded pockets from being provided in the guide surface of the static pressure gas guide or a control throttle for controlling the supplied gas from being used, whereas in the carriage apparatus of the present invention, pockets can be provided in the guide surface of the static pressure gas guide and a control throttle for controlling the supplied gas can be used. As a result, there can be obtained a carriage apparatus having a great load capacity and rigidity, and particularly a carriage apparatus having a very great load capacity and rigidity and of the type in which pockets are provided in the guide surface and the gas supplied to these pockets is controlled by a control throttle.

Generally describing the coupling between the ball nut and the housing, the gap between the shaft and the housing is simply filled with magnetic fluid, whereby a thin film of magnetic fluid whose outflow is prevented by permanent magnets is interposed between the two, and this leads to the provision of a static pressure gas bearing device in which vibration of the shaft is effectively restrained by the squeeze damping effect of the thin film of liquid and in which highly accurate and stable shaft support can be easily achieved.

Also, in this static pressure gas bearing device, self-excited vibration of the shaft is effectively restrained by the thin film of magnetic fluid and therefore, it becomes possible to provide bearing pockets in the bearing surface or to control the supplied gas of the static pressure gas bearing by a control throttle, and this leads to an effect that a static pressure gas bearing device of very high load capacity and rigidity can be achieved by simple means.

As regards the coupling between the ball nut and the carriage, a nut threadably fitted on a feed screw which has its axis parallel to the movement of direction of the carriage is provided with a pair of reception surfaces perpendicular to the direction of the axis of the feed screw, and a housing having bearing surfaces opposed to these reception surfaces is secured to the carriage. Also, by a fluid under pressure being supplied between the reception surfaces of the nut and the bearing surfaces of the housing, the nut is supported on the housing by opposed static pressure bearings, and a bearing pocket forming a circumferential groove is provided in the static pressure bearing portion. Thereby, the nut is made minutely displaceable relative to the housing substantially without resistance to parallel movement in the direction perpendicular to the axis of the feed screw, rotation of the feed screw about the axis thereof and inclination of the static pressure bearing with respect to the central point, and in the axial direction of the feed screw, the nut is supported on the housing by the static pressure bearing with high rigidity.

On the other hand, the nut is engaged with the carriage with a bellows interposed therebetween and therefore, it is made minutely displaceable by this bellows substantially without resistance to parallel movement in the direction perpendicular to the axis of the feed screw, movement of the feed screw in the axial direction thereof and inclination of the static pressure bearing with respect to the central point, and its rotation is prevented with high rigidity for rotation of the feed screw about the axis thereof. As a result, even if there is an error in the degree of parallelism of the feed screw to the direction of movement of the carriage or in the eccentricity of the feed screw, the displacement of the nut in the other directions than its feed direction for these errors is effectively absorbed and the forces in the other directions than the axial direction of the feed screw are not transmitted to the carriage, and this leads to an effect that there can be provided a carriage apparatus having very good accuracy of rectilinear movement.

What we claim is:

1. A carriage apparatus including a base bed generally having the shape of an upwardly opening container and provided with a first recess at the bottom thereof and second and third recesses in the opposite inner side portions, and a movable carriage generally having a shape that can be contained in said base bed and provided with a first protruded portion corresponding to said first recess at the bottom thereof and second and third protruded portions corresponding to said second and third recesses in the opposite outer side portions thereof, drive means including a feed screw for moving said carriage within said base bed, means for supplying compressed gas to the gap between said second protruded portion and said second recess and the gap between said third protruded portion and said third recess to form static pressure gas bearings, and means including a predetermined amount of liquid stored within the gap between said first protruded portion and said first recess for producing a squeeze damping effect so that self-excited vibration of said carriage by said static pressure gas bearings is restrained.

2. A carriage apparatus according to claim 1, having means including a control throttle for controlling said compressed gas.

3. A carriage apparatus according to claim 1, wherein a ball nut is threadable fitted on the feed screw rotatably supported on said base bed, said ball nut being provided with a flange portion and a vibration controlling disc, a housing made integral with said carriage is formed with recesses corresponding to said flanged portion and said vibration controlling disc, means for supplying compressed gas to the gap between said flange portion and the recess corresponding thereto, and the gap between said vibration controlling disc and the recess corresponding thereto is filled with magnetic fluid, and means including permanent magnets for preventing leakage of said magnetic fluid.

4. A carriage apparatus according to claim 3, having means including a control throttle for controlling said compressed gas.

5. A carriage apparatus according to claim 3, wherein an annular space for supplying compressed gas is formed between the flanged portion of said ball nut and said housing, and a bellows is disposed between a part of said ball nut and a bracket secured to said carriage.

6. A carriage apparatus according to claim 5, having means including a control throttle for controlling said compressed gas.

* * * * *